2,992,209
PROCESS OF PREPARING A POLYMER OF
ACRYLONITRILE
Myron Q. Webb and William K. Wilkinson, Waynesboro, Va., assignors to E. I. du Pont de Nemours and Company, Wilmington, Del., a corporation of Delaware
No Drawing. Filed Aug. 24, 1956, Ser. No. 605,947
6 Claims. (Cl. 260—79.3)

This invention relates to an improved polymerization process for the production of white polymers of acrylonitrile and more particularly to a method of reducing the slurry consistency of such process during polymerization.

Heretofore acrylonitrile homopolymers and copolymers of not less than 85% acrylonitrile content generally have been made in an aqueous system using a bisulfite activator and a persulfate catalyst in the ratio of about 2 to 1. Under such conditions the polymer yields are good but the polymer is more highly colored than desired. Another difficulty is that such polymers are not stable against discoloration when heated.

Recently methods have been proposed which result in polymers of much improved whiteness and color stability by increasing the ratios of activator to catalyst to more than 5 to 1 and preferably more than 10 to 1. Unfortunately this increased ratio results in lower yields. In order to overcome this difficulty the monomer feed may be increased to raise the polymer production rate, but due to greater concentration of polymer in the slurry, considerable difficulty is then experienced in pouring and stirring the mixture.

An object of the present invention is to provide an improved polymerization process in which high ratios of activator to catalyst and high monomer feed are used to produce a white polymer. Another object is the provision of a method which produces good yields of such polymer. A further object is the provision of a method which produces a relatively thin polymer slurry. Other objects will appear as the description of the invention proceeds.

These and other objects are accomplished by polymerizing acrylonitrile homopolymer and its copolymers in which the combined monomers contain at least 85% acrylonitrile in the presence of a bisulfite activator and a persulfate catalyst in the ratio of from about 5 to 1 to about 40 to 1 or more but preferably between 10 to 1 and 20 to 1, coupled with a high rate of monomer feed. This feed will depend on polymer conversion, being preferably between 20% and 55% at 90% conversion and varying inversely with conversion so that the total polymer solids in the slurry will run between about 18% to 50% based on the total weight of the slurry and will normally be too thick to handle in the normal manner. This thickness of the slurry is avoided in the present invention by polymerizing in the presence of from about 0.02% to 0.5% of an anionic surfactant based on the weight of the total feed.

The anionic surfactants that have been found satisfactory are the sodium salts of relatively long chain alkyl sulfates such as those obtained from technical lauryl alcohol and similar alcohols having from about 10 to 18 carbon atoms, sulfonated hydrocarbons, alkali metal salts of alkyl sulfo derivatives of dicarboxylic acids such as dioctyl sulfosuccinate sodium salt, dihexyl sulfosuccinate potassium salt, dibutyl sulfosuccinate ammonium salt and diethyl sulfosuccinate sodium salt. Any anionic surfactant may be used, but in general those of the type mentioned above are preferred.

By high rate of monomer feed is meant a total monomer feed rate of at least 20% of the total feed to the polymerizer and this monomer feed may be as much as 55% or more of the total feed rate depending on the yield or conversion of monomer to polymer and the concentration of catalyst and activator salts. By high ratios of activator to catalyst is meant that the weight ratio of the oxidizable sulfoxy activator to the persulfate catalyst shall be at least 5:1 and preferably at least 10:1. This ratio may be as high as 40:1 or even more with the production of polymers exhibiting excellent whiteness but usually the polymerization rate drops off too much at these very high ratios and most useful ratios are in the range of from 10:1 to 20:1. Generally high ratios of activator to catalyst bring about a substantial increase in total salt content in the polymerizing medium. Normally a 2:1 activator to catalyst ratio will amount to about 0.3% or less salt on the total feed or on the total amount of polymerizing medium. With the ratio of 10:1 the total salt content may be increased three or four times or more although if the amount of persulfate catalyst is drastically reduced say to 0.02% the high ratio may exist without any increase in total salt content and there will be no need for a slurry consistency depressant. However, at this very low catalyst level the molecular weight of the polymer will be exceedingly high and the percent conversion very low. Therefore, this invention is further characterized by the total salt content in the polymerizing medium, the amount of which that can be tolerated without the use of a slurry consistency depressant being dependent on the amount of polymer in the slurry.

The most important factor controlling slurry consistency is the amount of small particles present. Small particles are associated with thick slurries while large particles are associated with thin slurries at comparable solids content. Dissolved electrolytes and particularly bisulfite and persulfate ions are very effective in raising the slurry consistency by their precipitating power which tends to keep the polymer particles small. At a monomer feed rate of 20% and below and at 80% conversion there is no more than about 16% polymer in the slurry formed which is relatively thin and flowable even though the particles are small. With the bisulfite activator and the persulfate catalyst at concentrations normally used heretofore, relatively thin flowable slurries are obtained even at monomer feed rates as high as 40% (which gives about 32% polymer solids in the slurry) due to the formation of relatively large polymer aggregates. However, when a monomer feed rate of 30% was used in conjunction of a high ratio of bisulfite activator to persulfate catalyst (with a substantial increase in concentration of total bisulfite and persulfate salts over that normally used) the polymer slurry consistency became too thick to pour, hence did not flow easily from the reactor and would require increased agitation within the reactor itself to insure adequate mixing.

A useful workable empirical formula to indicate the general boundary at which slurry consistency needs modifying was developed and is as follows: If the product of percent monomer feed, times percent conversion, times percent catalyst and activator salt on total feed is equal to 1,000 or higher a slurry consistency depressant is needed. Applying this formula or rule to the usual prior practice wherein the monomer feed rate was 30%, the conversion 80% and the total catalyst and activator salt content of the polymerizing medium 0.3%, we have 30×80×0.3 equals 720. In this case the amount of bisulfite activator was 0.2% and the persulfate catalyst 0.1% of the total feed at a ratio of 2:1. If the ratio is changed to 10:1 by increasing the bisulfite concentration to 1.0% without changing the persulfate concentration the salt factor then becomes 1.1 and the formula gives a figure of 3520 (assuming conversion at 80%) which indicates a definite need for a consistency depressant.

In this system, anionic surfactants act in a unique manner in that they do not decrease particle size to produce fine dispersions but actually increase particle size and yield coarse particle slurries. Here the surfactant controls the particle size of the product by growing large particles or aggregates which is quite a different function from that normally expected of a surfactant.

The following examples are given by way of illustration but the invention is not limited to the amounts or the ingredients shown since the anionic surfactant given in the examples may be replaced in like amount by any other anionic surfactant including those mentioned above. Likewise the activator to catalyst ratio may vary within the limits mentioned, and the catalyst and activator may be replaced by one of the equivalents disclosed more fully hereinafter.

*Example I*

Each of the 5 test runs set forth in the table below were prepared as follows, of which 1, 2, and 3 lie outside the invention and are included for comparison.

Into a stirred, jacketed aluminum continuous reactor partly filled with deionized water acidified to a pH of 2.3 and heated to a temperature of about 45° C. was fed the following parts of reactants under polymerizing conditions:

|  | 1 | 2 | 3 | 4 | 5 |
|---|---|---|---|---|---|
| Acrylonitrile | 234 | 234 | 300 | 300 | 470 |
| Methyl Acrylate | 15 | 15 | 20 | 20 | 30 |
| Sodium styrenesulfonate | 0.75 | 0.75 | 1.0 | 1.0 | 1.5 |
| (Approx.) Percent Monomer on Total Feed | 25 | 25 | 30 | 30 | 40 |
| Potassium Persulfate | 1 | .5 | .5 | .5 | .5 |
| Sodium Metabisulfite | 1.7 | 10 | 10 | 10 | 10 |
| Sodium Lauryl Sulfate |  |  |  | 0.3 | 2.0 |
| Water | 750 | 750 | 750 | 750 | 750 |
| Sulfuric Acid | 0.1 | 0.1 | 0.1 | 0.1 | 0.1 |
| Percent Conversion | 75 | 70 | 80 | 76 | 86 |
| Percent Polymer Solids | 18.75 | 17.50 | 24.00 | 22.80 | 34.40 |
| Percent Salt (Cat.+act.) | 0.27 | 1.04 | 0.97 | 0.97 | 0.85 |
| Empirical formula value | 506 | 1,820 | 2,330 | 2,210 | 2,950 |
| Slurry Consistency | Thin | Very Thick | Won't Pour | Thin | Fluid |

A comparison of Items 1 and 2 and 3 shows the effect of polymer plus catalyst and activator salts on slurry thickness.

The presence of sodium styrenesulfonate in the polymer accentuates the slurry consistency problem to a small extent, making for somewhat thicker slurry consistencies. The fact that sodium lauryl sulfate will cure this slurry consistency problem indicates that it would be even more effective on solving consistency problems involving a copolymer of only acrylonitrile and methyl acrylate. A comparison of Items 3, 4 and 5 shows the effect of sodium lauryl sulfate on thinning the slurry even at high monomer feeds. The addition of sodium lauryl sulfate to a thick slurry causes no thinning of the slurry unless polymerization is occurring; therefore, it is believed that the action is more complex than mere lowering of the surface tension.

*Example II*

The following continuous polymerization tests were run each involving a relatively high concentration of sodium metabisulfite activator. The proportions of ingredients shown are based on 1,000 total parts.

| Objective | 1 | 2 | 3 |
|---|---|---|---|
|  | Thick Slurry From 1% Salt Content | Thinning of No. 1 by an SCD[1] | Thinning of 2.0% salt, high solids, by an SCD[1] |
| Percent Monomer Feed | 25 | 25 | 45. |
| Percent Salt (Cat. plus Activator) | 1.0 | 1.0 | 1.98. |
| Acrylonitrile | 234 | 234 | 422. |
| Methyl Acrylate | 15 | 15 | 27. |
| Sodium Styrenesulfonate | 0.5 | 0.5 | 0.9. |
| Potassium Persulfate | 0.75 | 0.75 | 1.8. |
| Sodium Metabisulfite | 10 | 10 | 18. |
| Sodium Lauryl Sulfate | None | 1.2 | 2.0. |
| Sulfuric Acid | 0.1 | 0.1 | 0.1. |
| Water | 739.65 | 738.45 | 528.2. |
| Slurry Consistency | Too thick to stir well. | Thin | Useably Thin. |
| Percent Conversion | (est. 72) | 72 | 83. |
| Empirical formula value | 1,800 | 1,800 | 7,400. |
| Intrinsic Viscosity |  | 1.2 | 1.35. |

[1] SCD—slurry consistency depressant.

The composition of tests 1 and 2 were the same except in test 2, 1.2 parts (0.12%) of sodium lauryl sulfate was present during polymerization and as the result the polymer slurry was thin and readily flowable whereas in test 1 to which no slurry consistency depressant was added the slurry was too thick to handle effectively. In test 3 the monomer feed was 45% of the total and the combined catalyst and activator salts were nearly 2% and the value obtained by applying the empirical formula was approximately 7400 which certainly calls for a slurry consistency depressant. In this case the use of two parts (0.2%) of sodium lauryl sulfate during polymerization sufficiently improved fluidity to make this recipe useful.

*Example III*

Into a stirred jacketed aluminum continuous reactor partly filled with water acidified to a pH of about 3.6 with sulfuric acid and heated to about 45° C. the following polymerization ingredients were fed in the proportions indicated. The monomer feed consisted of about 93.7% acrylonitrile, about 6% methyl acrylate and .26% sodium styrenesulfonate.

| | Percent |
|---|---|
| Total monomer feed | 30 |
| Potassium persulfate | 0.078 |
| Sodium metasulfite | 1.20 |
| Sulfuric acid | 0.04 |
| Sodium lauryl sulfate | 0.10 |
| Water, about | 68.6 |

After steady state conditions were reached, the slurry was still readily flowable and at a conversion of about 75% the empirical formula gave a value of over 2800. Without the very small addition of the sodium lauryl sulfate, or other anionic surfactant, the polymer slurry could not be handled.

*Example IV*

Two acrylonitrile copolymers composed of about 94% acrylonitrile and 6% methyl acrylate were prepared in a continuous reactor as described in Example I. These runs were made with and without a slurry consistency depressant with the following feed rates as percent of the total feed, the balance of the feed being water with sufficient sulfuric acid to maintain a pH of about 3.5.

|  | 1 | 2 |
|---|---|---|
| Percent Monomer Feed | 22 | 30. |
| Conversion | 73 | 80. |
| Potassium Persulfate+Sodium Bisulfite | 1.27 | 1.34. |
| Sodium Lauryl Sulfate | None | 0.075. |
| Slurry Consistency | Thick (difficult to handle). | Thin. |
| Empirical Formula Value | 2,040 | 3,216. |

The products from the continuous reactors in the cases involving this invention were isolated in the usual manner. The aggregates formed were larger than when no anionic surfactant was used and continuous filtration and washing of the polymer were even easier.

While only a few copolymers of acrylonitrile have been given in the examples above, the invention is applicable to any combination of polymerizable addition monomers in which at least 85% of the monomer mixture is acrylonitrile. Acrylonitrile alone may be polymerized advantageously to homopolymers through the use of this invention. Copolymerization in accordance with this invention may be effected using not less than 85% acrylonitrile and for the balance of the polymer one or more of the ethylenically unsaturated monomers such as methyl methacrylate, ethyl methacrylate, butyl methacrylate, octyl methacrylate, methoxyethyl methacrylate, chlorethyl methacrylate, phenyl methacrylate, cyclohexyl methacrylate, dimethylamidoethyl methacrylate, and the corresponding esters of acrylic and alpha chloracrylic acids; acryl and methacryl amides or alkyl substituted products thereof; unsaturated ketones such as methyl vinyl ketone, phenyl vinyl ketone, methyl isopropenyl ketone and the like; vinyl carboxylates such as vinyl formate, vinyl acetate, vinyl propionate, vinyl butyrate, vinyl chloracetate, vinyl thiolacetate, vinyl benzoate, and vinyl stearate; vinyl halides such as vinyl chloride, vinyl fluoride, vinyl bromide, vinylidine chloride, vinylidine bromide, etc.; ethylene-alpha, beta-carboxylic acids or their anhydrides or derivatives such as maleic, fumaric, citraconic, mesaconic, aconic acids, esters, half esters and the like; N-alkyl maleimides, N-vinyl carbazol, N-vinyl succinimide, N-vinyl phthalimide, vinyl ethers, etc.

Hydrolyzable salts of ethylenically unsaturated acids such as the alkali metal or ammonium salts of allyl sulfonic acid, methallyl sulfonic acid, isopropenylbenzenesulfonic acid, vinyl methylbenzenesulfonic acid, vinyl hydroxybenzenesulfonic acid, vinyl benzoic acid, sulfoacrylic acid, acrylic acid, vinyl sulfobenzoic acid, etc. may also be used preferably in combination with a neutral monomer such as mentioned in the preceding paragraph along with not less than 85% acrylonitrile.

Although the examples had been confined to persulfate catalyst and besulfite activators, other similar compounds may be used in their place. The catalyst may be any water-soluble salt of perdisulfuric acid used in combination with a water-soluble oxidizable sulfoxy compound in which the valence of the sulfur atom does not exceed four; such as sodium bisulfite, sodium metabisulfite, sodium hydrosulfite, sodium thiosulfate and other similar water-soluble salts.

By means of this invention acrylonitrile polymer products greatly improved in whiteness are made possible and without loss in productive capacity. The simple expedient of introducing a small amount of an anion surfactant into the polymerizer has forestalled investment in expensive heavy duty stirring equipment or investment in additional monomer recovery equipment and the added expense of operating a more complex system. Rather, the invention enables production to be increased using the same equipment as before and because of the larger polymer aggregates produced by the practice of this invention yield relatively thin slurries, stirring and filtration of the polymer slurry and washing of the polymer is made even easier.

It will be apparent that many widely different embodiments of this invention may be made without departing from the spirit and scope thereof, and therefore it is not intended to be limited except as indicated in the appended claims.

We claim:

1. The process of preparing white polymers of acrylonitrile which comprises continuously feeding into a reaction zone monomeric material selected from the group consisting of acrylonitrile and mixtures containing at least 85% acrylonitrile and the balance being a different ethylenically unsaturated addition monomer copolymerizable therewith at the rate of 20% to 55% by weight based on the total feed, a bisulfite activator and a persulfate catalyst, the activator being present in the amount of at least about 10 parts by weight for each part of catalyst and from 0.02% to 0.5% by weight based on the total feed of a surfactant, and maintaining the reaction zone under polymerizing conditions with a total polymer solids content between about 18% to 50% based on the total weight of the reaction mixture, the said reaction mixture being a thin pourable slurry at 45° C., the same mixture at 45° C. without the surfactant being a thick non-pourable slurry, the product of the percent monomer feed, percent conversion, and percent combined activator and catalyst salts based on the weight of the total feed being equal numerically to at least 1000.

2. The process of claim 1 in which the monomeric material contains at least 85% acrylonitrile and the balance being methyl acrylate and an alkali metal styrene-sulfonate.

3. The process of claim 1 in which the activator is sodium metabisulfite and the catalyst is potassium persulfate.

4. The process of claim 1 in which the activator to catalyst ratio is below about 40 to 1.

5. The process of claim 1 in which the activator to catalyst ratio is from about 10:1 to about 20:1.

6. The process of claim 1 in which the catalyst is a water-soluble salt of perdisulfuric acid and the activator is a water-soluble oxidizable sulfoxy compound in which the valence of the sulfur dose not exceed four.

References Cited in the file of this patent

UNITED STATES PATENTS

| | | |
|---|---|---|
| 2,486,241 | Arnold | Oct. 25, 1949 |
| 2,616,917 | Coover et al. | Nov. 4, 1952 |
| 2,629,711 | Stanin et al. | Feb. 4, 1953 |
| 2,692,875 | Weinstock et al. | Oct. 26, 1954 |
| 2,719,142 | Van Dijk et al. | Sept. 27, 1955 |
| 2,743,263 | Coover et al. | Apr. 24, 1956 |
| 2,777,836 | Everard et al. | Jan. 15, 1957 |
| 2,837,500 | Andres et al. | June 3, 1958 |